J. P. Kirk,
Harness Ring,
Nº 30,632. Patented Nov. 13, 1860.
Fig. 1. Fig. 3.
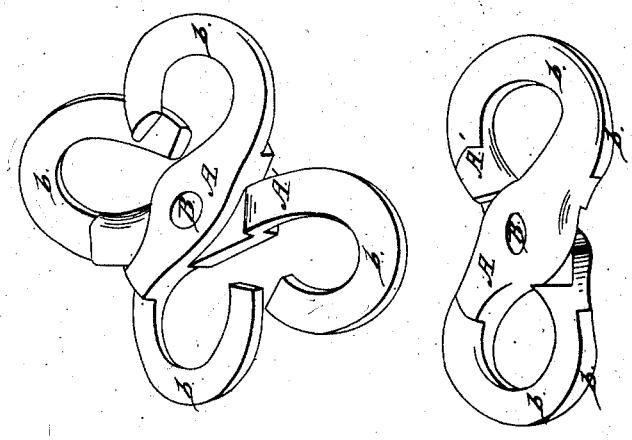
Fig. 2. Fig. 4.
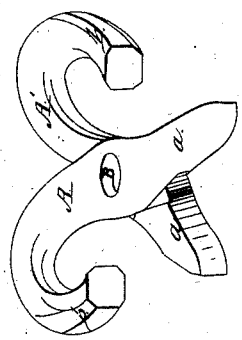 
Witnesses:
J. W. Coombs
R. S. Spencer
Inventor,
John P. Kirk
per Munn & Co.
Attorneys

UNITED STATES PATENT OFFICE.

JOHN P. KIRK, OF AUSTIN, TEXAS.

CHAIN-LINK.

Specification of Letters Patent No. 30,632, dated November 13, 1860.

*To all whom it may concern:*

Be it known that I, JOHN P. KIRK, of Austin, in the county of Travis and State of Texas, have invented a new and useful Improvement in Connecting-Links; and I do hereby declare that the following is a full, clear, and exact description thereof, reference being had to the accompanying drawings, making a part of this specification, in which—

Figure 1, shows a perspective view of the improved connecting link when open. Fig. 2, shows the same when closed. Fig. 3, is a perspective view of a modification of the hook of Figs. 1 and 2, open. Fig. 4, shows the hook of Fig. 3, closed.

Similar letters of reference indicate corresponding parts in the four figures.

This invention is to be used as a substitute for lap-rings, fastening hooks, or any thing of this class used for connecting parts requiring to be occasionally disconnected in using them; for example, to connect a swingle-tree to a double tree, or to the clevis of a plow etc., as a ready, convenient and efficient way of connecting the parts of a broken chain, and in similar cases my invention is applicable.

It consists, in pivoting together in a suitable manner, two hooks, the two forming a shape similar to, or alike the figure 8. It admits of two modifications:

The first, and principal one—which the drawing represents,—consists of two parts pivoted together—each part consisting of a hook on one end, and a straight shank on the other. They are pivoted together with the open part of each hook on the same side, so that the shank end of one part closes up the hook end of the other part. The pivot is not central, but nearest the open side of the hooks,—so that when the connecting link is finished, any attempt to draw upon the hooks, in an opposite direction and from their axis, will cause the hook ends to bear hard against the shank ends, the latter supporting the former; and the ends of shanks and hooks must be cut—not square—but sloping in such a manner, that the shank end will prevent the hook end from bending out, when under a strain exceeding the stiffness of the metal, and as shown in the model. The middles are so flattened, and the ends so bent, that the whole operates in a true plane, and the ends abut truly in the manner described.

The second modification consists in simply elongating and curving the shank end of each part, so that each part forms a shape similar to the letter S; and instead of the ends abutting in the manner described, they are all beveled or tapered, and lap on each other, with or without a shoulder or shoulders. The pivot is in this modification either central, or not central as named above—the latter being preferable.

There may be projections, or tenons from the hook or shank parts, as the case may be, which will pass into grooves or mortises cut into the corresponding parts of the link when closed, applicable to both modifications; or as shown in Figs. 2 and 3.

Instead of flattening the two parts where the pivot or rivet is to connect them together,—a single slotted joint, similar to that of a pair of pliers may be made; but the ordinary lapped joint will be less expensive, and it will serve for all ordinary purposes.

To enable those skilled in the art to make and use my invention, I will proceed to describe the proper mode for its construction and manufacture.

The two parts A A′, forming this connecting link—of either modification—are exactly alike. To manufacture them with facility and rapidity, a steel die is used of the following construction: It is made in two parts—bottom, and top; the bottom part has two or more guides (pins)—which fit into corresponding holes or grooves in the top half;—so that they are compelled to come together truly. When together, the cavity between them is such, that if filled up with liquid metal, it will form one of the two parts of the link, complete—the central hole for the pivot B included. Although— with tough cast metal, a cast connecting link would do very well,—the intention is to make a more merchantable and serviceable article by cutting the hot wrought iron in this die. For this purpose the inside edges of the die are sharp, so as to cut like a chisel—the bevel being toward the outside. These sharp edges are to come very nearly together; they are kept sufficiently apart— enough to prevent injuring each other, by broad faces of each part of the die—removed from the cutting edges—which faces meet and stop the closer approach of the two parts of the die. To form a link in this die, suitable iron is brought to the proper heat in a forge, flattened down so as to be, in the average, rather thinner than the space in the die—up and down,—and then it is placed upon the bottom part of the die; the top part is placed on,—and—guided by said pins and grooves,—it is hammered or forced down until the abutting faces meet. The central hole for the pivot or rivet is formed by a pin in one part of the die, with sharp edges—which will cut and force out the hot iron through a hole in the other part of the die.

The pivot or rivet B with which the two parts of the link are connected, is also made in a proper die. Before riveting the parts together, several thicknesses of paper or other material are placed between the two parts; so that when the riveting is finished and this paper or substitute burned out or otherwise removed, the link will have slight play room, and will open and close without binding. Both modifications are also easily manufactured by hand, without the aid of a die; the second modification however—with tapered ends lapping on each other, is best suited to be thus constructed or made by hand without a die, as named.

Having thus described my invention what I claim as new, and desire to secure by Letters Patent, is—

The two pivoted hooks A, A' constructed and put together in such a manner that the ends of one hook will abut against or lap on the ends of the other hook substantially as and for the purposes herein set forth.

JOHN P. KIRK.

Witnesses:
C. V. LITTLEPAGE,
L. H. LUCKETT.